(12) United States Patent
Dooley et al.

(10) Patent No.: US 8,497,020 B2
(45) Date of Patent: *Jul. 30, 2013

(54) PRECISION WOOD PARTICLE FEEDSTOCKS

(71) Applicant: Forest Concepts, LLC, Auburn, WA (US)

(72) Inventors: James H. Dooley, Federal Way, WA (US); David N. Lanning, Federal Way, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,690

(22) Filed: Jan. 11, 2013

(65) Prior Publication Data

US 2013/0115459 A1  May 9, 2013

Related U.S. Application Data

(63) Continuation-in-part of application No. 13/594,312, filed on Aug. 24, 2012, which is a continuation-in-part of application No. PCT/US2011/033584, filed on Apr. 22, 2011, which is a continuation-in-part of application No. 12/966,198, filed on Dec. 13, 2010, now Pat. No. 8,039,106, which is a continuation of application No. 12/907,526, filed on Oct. 19, 2010, now Pat. No. 8,034,449.

(60) Provisional application No. 61/343,005, filed on Apr. 22, 2010, provisional application No. 61/663,367, filed on Jun. 22, 2012.

(51) Int. Cl.
*B32B 5/16* (2006.01)

(52) U.S. Cl.
USPC ............ 428/402; 428/15; 428/17; 428/18; 144/373; 47/9

(58) Field of Classification Search
USPC ............ 428/402, 15, 17, 18; 144/373; 47/9
See application file for complete search history.

(56) References Cited

U.S. PATENT DOCUMENTS

| 1,867 | A |   | 10/1840 | Winans et al. |         |
|-------|---|---|---------|---------------|---------|
| 19,971 | A |   | 4/1858 | Wheeler |         |
| 1,477,502 | A |   | 12/1923 | Killick |         |
| 1,980,193 | A |   | 11/1934 | Finegan |         |
| 2,773,789 | A |   | 12/1956 | Clark |         |
| 2,776,686 | A | * | 1/1957 | Clark | 144/373 |
| 3,393,634 | A |   | 7/1968 | Blackford |         |
| 3,396,069 | A |   | 8/1968 | Logan et al. |         |
| 3,415,297 | A |   | 12/1968 | Yock |         |
| 3,797,765 | A |   | 3/1974 | Samuels |         |
| 4,364,423 | A |   | 12/1982 | Schilling |         |
| 4,558,725 | A |   | 12/1985 | Veneziale |         |
| 4,681,146 | A |   | 7/1987 | Liska et al. |         |
| 5,029,625 | A |   | 7/1991 | Diemer |         |
| 5,199,476 | A |   | 4/1993 | Hoden |         |
| 5,215,135 | A |   | 6/1993 | Coakley et al. |         |
| 5,505,238 | A |   | 4/1996 | Fujii et al. |         |
| 5,533,684 | A |   | 7/1996 | Bielagus |         |
| 5,842,507 | A |   | 12/1998 | Fellman et al. |         |
| 6,267,164 | B1 | * | 7/2001 | Carpenter | 144/373 |
| 6,575,066 | B2 |   | 6/2003 | Arasmith |         |
| 6,729,068 | B2 | * | 5/2004 | Dooley et al. | 47/9 |
| 7,291,244 | B2 |   | 11/2007 | DeZutter et al. |         |
| 7,988,580 | B2 | * | 8/2011 | McCrary | 475/72 |
| 7,998,580 | B2 |   | 8/2011 | Brandenburg |         |
| 8,034,449 | B1 | * | 10/2011 | Dooley et al. | 428/402 |
| 8,039,106 | B1 | * | 10/2011 | Dooley et al. | 428/402 |
| 8,158,256 | B2 | * | 4/2012 | Dooley et al. | 428/402 |
| 2005/0025989 | A1 |   | 2/2005 | Brandenburg |         |
| 2006/0219826 | A1 |   | 10/2006 | Yamamoto |         |
| 2007/0045456 | A1 |   | 3/2007 | Medoff |         |
| 2009/0145563 | A1 |   | 6/2009 | Jarck |         |

FOREIGN PATENT DOCUMENTS

| DE | 102007014293 A1 |   | 10/2008 |
|----|-----------------|---|---------|
| EP | 0394890 A2 |   | 4/1990 |
| EP | 1 525 965 A2 |   | 4/2005 |
| EP | 2045057 A1 |   | 4/2009 |
| WO | WO97/17177 | * | 5/1997 |
| WO | WO 97/17177 |   | 5/1997 |
| WO | WO 9717177 |   | 5/1997 |

OTHER PUBLICATIONS

International Search Report, dated Aug. 30, 2011, in International Application No. PCT/US2011/033584.

* cited by examiner

*Primary Examiner* — Leszek Kiliman
(74) *Attorney, Agent, or Firm* — Thomas F. Broderick

(57) ABSTRACT

Wood particles having fibers aligned in a grain, wherein: the wood particles are characterized by a length dimension (L) aligned substantially parallel to the grain, a width dimension (W) normal to L and aligned cross grain, and a height dimension (H) normal to W and L; the L×H dimensions define two side surfaces characterized by substantially intact longitudinally arrayed fibers; the W×H dimensions define two cross-grain end surfaces characterized individually as aligned either normal to the grain or oblique to the grain; the L×W dimensions define two substantially parallel top and bottom surfaces; and, a majority of the W×H surfaces in the mixture of wood particles have end checking.

8 Claims, 6 Drawing Sheets

↑ 4.8 mm

↑ 4.8 mm

US 8,497,020 B2

PRECISION WOOD PARTICLE FEEDSTOCKS

STATEMENT OF GOVERNMENT LICENSE RIGHTS

This invention was made with government support by the Small Business Innovation Research program of the U.S. Department of Energy, Contract SC0002291. The United States government has certain rights in the invention.

FIELD OF THE INVENTION

Our invention relates to precision wood particle mixtures manufactured by rotary bypass shear comminution of wood chip raw materials.

BACKGROUND OF THE INVENTION

"Wood chips" are small pieces of wood of generally uniform size and shape produced from fresh tree trunks and limbs by mechanical treatment (chipping) with sharp tools such as knives. Wood chips typically have a parallelepiped shape with six rhombus faces and a low and consistent thickness compared to length and width dimensions. Length along the grain direction is generally 5 to 50 mm (0.2 to 2 inches). The cross-grain ends are smoothly cut (chipped) at an oblique angle to induce chip formation at appropriate thickness. Particular sizes and shapes of chips have long been standardized as feedstocks for pulp and paper production, particleboard manufacture, and other industrial uses. For example, chips for pulp and paper manufacturing generally maximize intact fibers and fiber bundles along the grain between chipper-cut ends. Several generations of chipping equipment have been developed to produce such wood-chip feedstocks. However, conventional wood chips are not optimal as direct feedstocks for many biomass conversion processes.

In the case of biofuel production it is preferable to maximize diffusion and heat-transfer distances both across and along the grain. It is also preferable to cut across the fiber bundles rather than preserve their natural length. In addition, many biofuel processes require small feedstock particle sizes. Re-comminution of wood chips has introduced processing concerns. Milling and grinding affects biomass particle shape as well as size. The hammer mill process tends to break wood chips multiple times along the grain, initially into narrow sticks (aka, pin chips) and eventually into narrower fiber bundles that tend to retain the full chip length. Likewise, grinding, wet milling, and crushing tend to separate fibers without cutting across the grain. Such comminution machines often require dry chips, at 15% wet wood basis (wwb) or less, yet drying woody biomass below its fiber saturation point, approximately 40-45% wwb (~30% dry basis), is an energy intensive process that may increase feedstock recalcitrance during conversion processing.

Thus, it would be advantageous to provide comminuted wood-chip particles with properties more favorable to biomass conversion processing.

SUMMARY OF THE INVENTION

We have applied engineering design principles to develop a low-energy comminution process that produces a new class of wood particle feedstocks from wood chips and hog fuel.

Representative embodiments include mixtures of wood particles having fibers aligned in a grain, wherein: the wood particles are characterized by a length dimension (L) aligned substantially parallel to the grain, a width dimension (W) normal to L and aligned cross grain, and a height dimension (H) normal to W and L; the L×H dimensions define two side surfaces characterized by substantially intact longitudinally arrayed fibers; the W×H dimensions define two cross-grain end surfaces characterized individually as aligned either normal to the grain or oblique to the grain; the L×W dimensions define two substantially parallel top and bottom surfaces; and a majority of the W×H surfaces in the mixture of wood particles have end checking Representative embodiments are shown in FIGS. 1B and 1C. The subject wood particles preferably have a retained field moisture content of greater than 30% dry basis.

DETAILED DESCRIPTION OF THE PREFERRED EMBODIMENTS

The term "grain" as used herein refers generally to the arrangement and longitudinally arrayed direction of fibers within plant biomass materials. "Grain direction" is the orientation of the long axis of the dominant fibers in a piece of plant biomass material.

The terms "checks" or "checking" as used herein refer to lengthwise separation and opening between plant fibers in a biomass feedstock particle. "Surface checking" may occur on the lengthwise surfaces a particle (particularly on the L×W surfaces); and "end checking" occurs on the cross-grain ends (W×H) of a particle.

The term "extent" as used herein refers to an outermost edge on a particle's surface taken along any one of the herein described L, W, and H dimensions (that is, either parallel or normal to the grain direction, as appropriate); and "extent dimension" refers to the longest straight line spanning points normal to the two extent edges along that dimension. "Extent volume" refers to a parallelepiped figure that encompasses a particle's three extent dimensions.

The term "skeletal surface area" as used herein refers to the total surface area of a biomass feedstock particle, including the surface area within open pores formed by checking between plant fibers. In contrast, "envelope surface area" refers to the surface area of a virtual envelope encompassing the outer dimensions the particle, which for discussion purposes can be roughly approximated to encompass the particle's extent volume.

The term "field moisture content" refers to wood chips and hog fuel materials that retain a harvested moisture content above the approximately 30% (dry basis, db) fiber saturation point below which the physical and mechanical properties of wood begin to change as a function of moisture content. Such a wood material has not been dried below its fiber saturation point and then rehydrated, e.g., by soaking in water.

The adjectives "green" and "seasoned" indicate wood chips and hog fuel materials having moisture contents of more than or less than 19% db, respectively.

The term "disc" refers to a circular object having a uniform thickness (Td) between two opposing flat sides of equal diameter. Td is conveniently measured with an outside caliper.

The new class of wood particles described herein can be readily optimized in size and shape for particular end-user processes and specifications.

We have found it very convenient to use wood chips as a raw material. Our preferred manufacturing method is to feed green wood chips one or more times into a rotary bypass shear with the grain direction oriented randomly to the feed direction through the machine's processing head.

Figure 2:
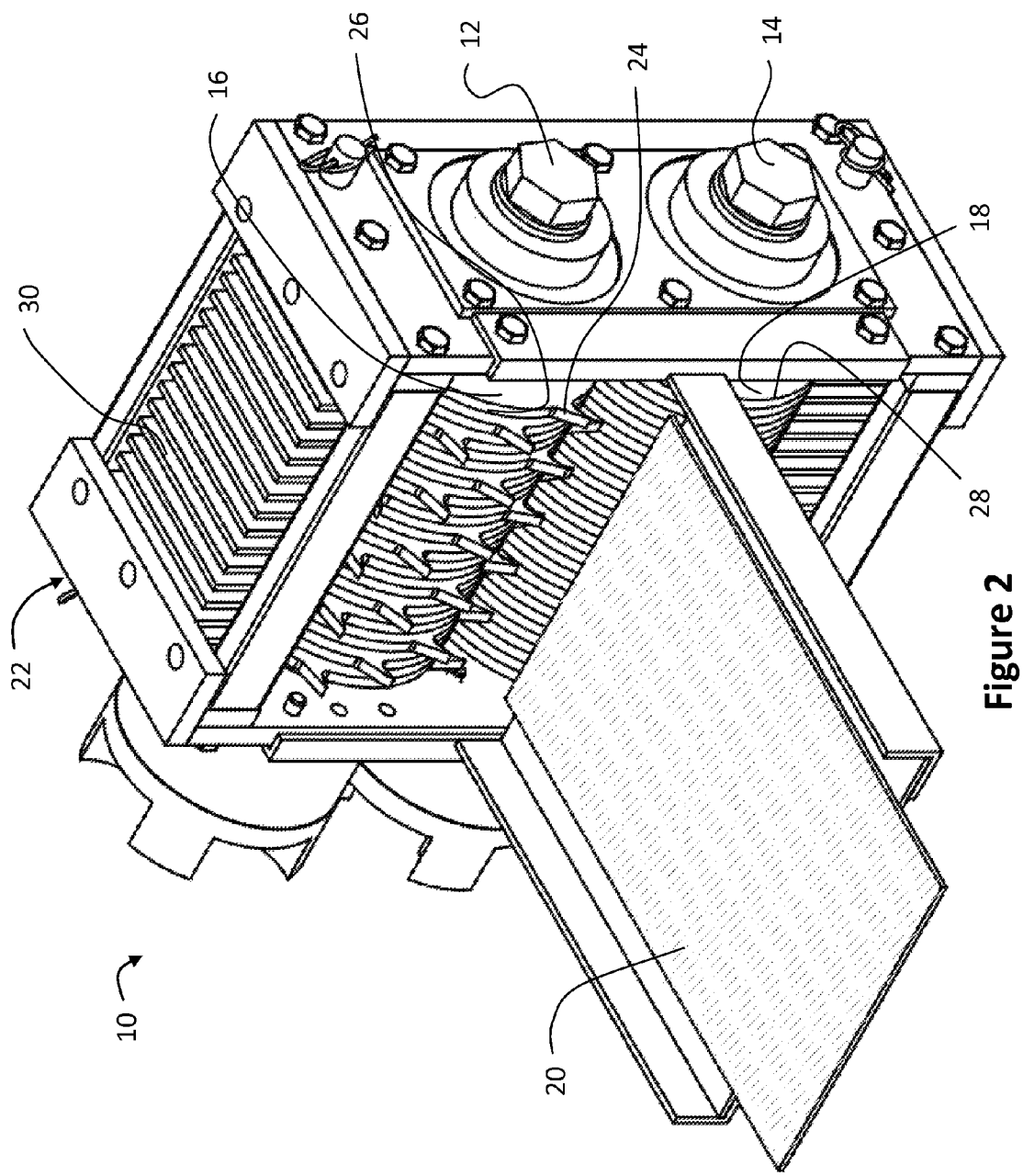
FIG. 2 is a perspective view of a prototype rotary bypass shear machine suitable to produce wood particles of the present invention.

The rotary bypass shear that we designed for manufacture of wood feedstock particles is shown in FIG. 2. This prototype machine 10 is much like a paper shredder and includes parallel shafts 12, 14, each of which contains a plurality of cutting disks 16, 18. The disks 16, 18 on each shaft 12, 14 are separated by smaller diameter spacers (not shown) that are the same width or greater by 0.1 mm thick than the cutting disks 16, 18. The cutting disks 16, 18 may be smooth 18, knurled (not shown), and/or toothed 16 to improve the feeding of wood chips 20 through the processing head 22. Each upper cutting disk 16 in the depicted rotary bypass shear 10 contains five equally spaced teeth 24 that extend 6 mm above the cutting surface 26. The spacing of the two parallel shafts 12, 14 is slightly less than the diameter of the cutting disks 16, 18 to create a shearing interface. In our machine 10, the cutting disks 16, 18 are approximately 105 mm diameter and the shearing overlap is approximately 3 mm.

This rotary bypass shear machine 10 used for demonstration of the manufacturing process operates at an infeed speed of one meter per second (200 feet per minute). The feed rate has been demonstrated to produce similar particles at infeed speeds up to 2.5 meters per second (500 feet per minute).

The width of the cutting disks 16, 18 establishes one facet of the particles produced since the wood 20 (veneer is shown in this view) is sheared at each edge 28 of the cutters 16, 18. Thus, wood particles from our process are of more uniform size than are wood-chip particles from shredders, hammer mills and grinders that tend to split the chips grain wise. The desired length of the facets is set into the rotary bypass shear machine 10 by either installing cutters 16, 18 having widths equal to the desired output facet length or by stacking assorted thinner cutting disks 16, 18 to the appropriate cumulative cutter width.

Fixed clearing plates 30 ride on the rotating spacer disks to ensure that any particles that are trapped between the cutting disks 16, 18 are dislodged and ejected from the processing head 20.

We have found that frictional and Poisson forces that develop as the wood chip material 20 is sheared at a cutter edge 28 tend to create end checking that greatly increases the skeletal surface areas of the particles.

The subject wood particle feedstocks are described in more detail below.

A Uniform Size Distribution Profile

Figure 3:
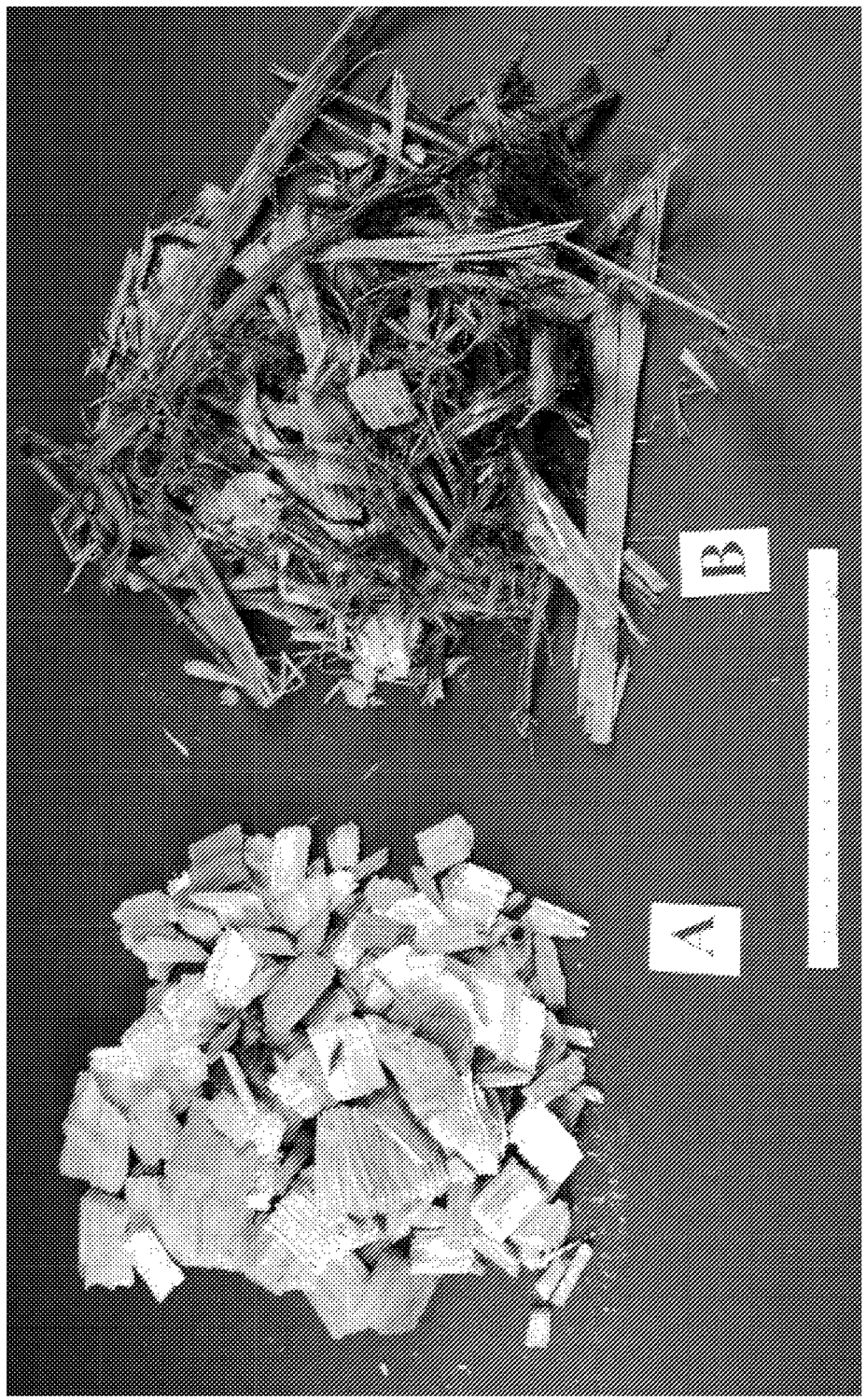
FIG. 3 (Prior Art) is a photograph of two industrial wood chip starting materials, (A) Douglas fir fuel grade chips and (B) whole-tree eucalyptus chips.

Two industrial wood chip raw materials, shown in FIG. 3, were comminuted by rotary bypass shear, and the particle size distributions of the resulting feedstocks were determined.

One starting material was fresh whole-tree Douglas fir fuel-grade chips that were destined for industrial power generation. As shown in FIG. 3A, these fuel chips were exceptionally clean, uniform, and mostly bark-free.

A sample of these fuel chips (53% wwb; as determined using the moisture content protocol described below) was subdivided into subsamples for processing through a Crumbler™ machine equipped with 3/16" (4.8 mm) cutters.

One subsample that was not processed ("no-pass") was reserved as a control. A second subsample was gravity fed in random orientations through the cutting head a single time ("one-pass"). A third subsample was passed through the cutting head twice ("two-pass"), that is, the raw chips were comminuted a first time, and then the comminuted material was sent through the cutting head in random orientations a second time.

Figure 1:
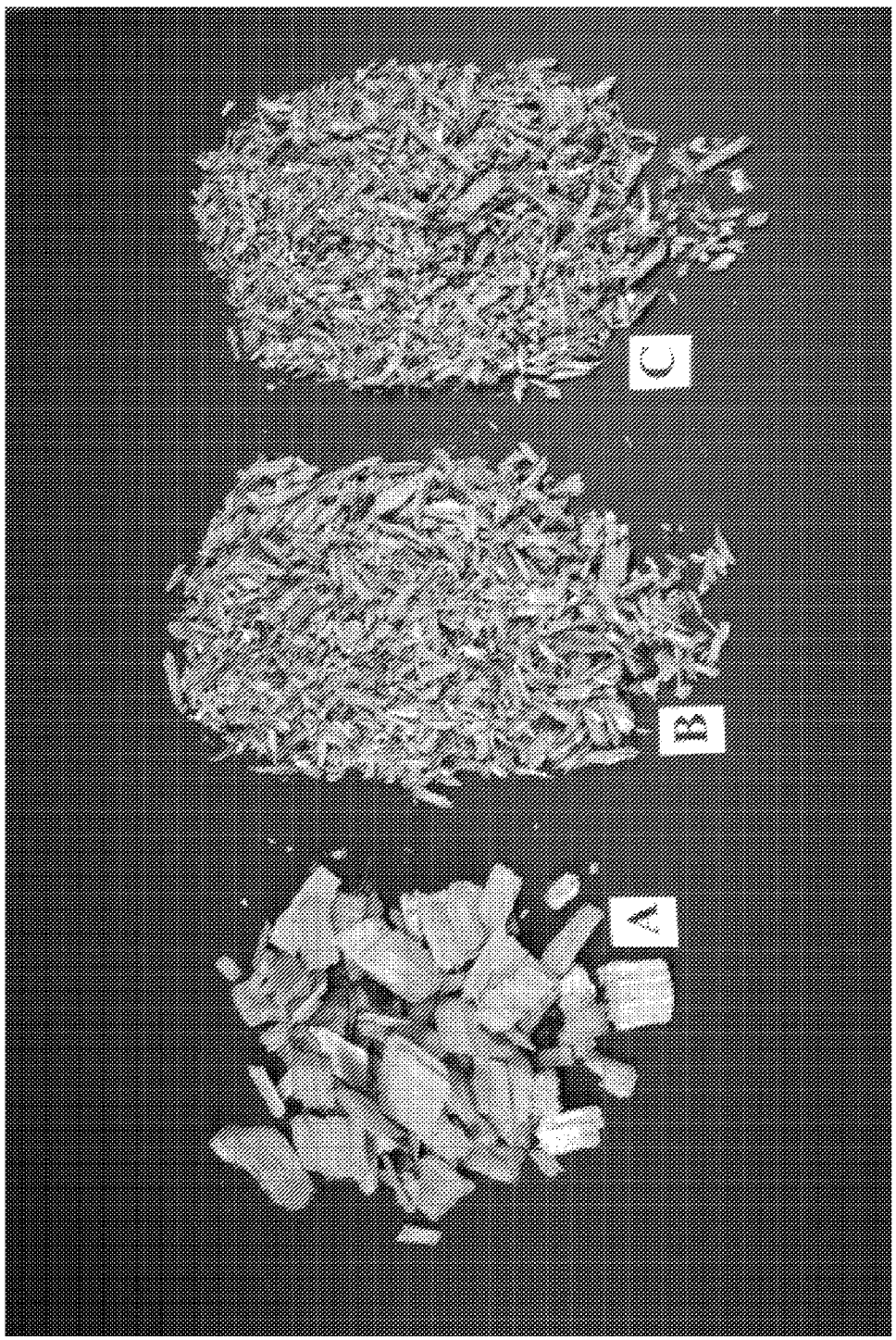
FIG. 1 is a photograph of of 100-gram portions of three comminuted Douglas fir chip subsamples: A, wood chips (prior art); B, one-pass wood particles; and C, two-pass wood particles.

Prior to size sorting, each of the three subsamples was dried to constant weight at 110° F. (43° C.). FIG. 1 is a photograph of 100-gram portions of these three dried softwood subsamples: A, no-pass; B, one-pass; and C, two-pass.

The dried subsamples were each size sorted on a Gilson® tapping sieve shaker, Sieve Screen Model No. SS-12R. Size distribution profiles were characterized by shaking ~500 or 1000 g of each subsample for 10 minutes in a stacked assembly of 3 inch, 1½ inch, ½ inch, ¼ inch, No. 8, No. 16, and Pan screens having the nominal sieve size openings noted in the "mm" column in the Table 1, which shows the resulting data (expressed as weight (g) and portion (%) of starting material retained on each screen).

TABLE 1

| Sieve | mm | No pass | | 1 pass | | 2 pass | |
| --- | --- | --- | --- | --- | --- | --- | --- |
| | | g | % | g | % | g | % |
| 3 inch | 75.00 | 0 | 0 | 0 | 0 | 0 | 0 |
| 1½ inch | 37.50 | 10.45 | 2.3 | 0 | 0 | 0 | 0 |
| 1 inch | 25.00 | 85.28 | 18.6 | 0 | 0.7 | 0 | 0 |
| ½ inch | 12.50 | 246.01 | 53.6 | 6.19 | 33.4 | 1 | 0.1 |
| ¼ inch | 6.30 | 92.50 | 20.2 | 313.95 | 58.6 | 70.11 | 7.2 |
| No. 8 | 2.36 | 19.57 | 4.3 | 550.63 | 5.4 | 775.35 | 79.3 |
| No. 16 | 1.18 | 2.38 | 0.5 | 51.08 | 1.9 | 99.70 | 10.2 |
| Pan | 0 | 2.76 | 0.6 | 18.27 | 100 | 31.51 | 3.2 |
| Total | | 458.96 | 100 | 940.11 | 100 | 977.75 | 100 |
| Shown in FIG. | | 1A | | 1B | | 1C | |

Figure 4:
FIG. 4 is a photgraph of 100-gram portions of four comminuted eucalyptus chip subsamples: A, wood chips (prior art); B, one-pass; C, two-pass; and D, three-pass.

The other starting material was fresh whole-tree eucalyptus chips destined for hammermilling into pellet furnish. As shown in FIG. 3B, the eucalyptus chips were relatively heterogeneous in size, shape, and anatomical content (with stringy bark and leaves). A sample of these eucalyptus chips (51% wwb) was subdivided and processed as described above, except that a fourth subsample was processed three times ("3 pass") through the cutting head. The subsamples were then dried as described above. FIG. 4 is a photograph of 100-gram portions of these four dried hardwood subsamples: A, no-pass; B, one-pass; C, two-pass; and D, three-pass.

Each of the subsamples was size sorted as described above, except that a wider array of screen sizes were used, as indicated in Table 2, which summarizes the particle size distributions of the four subsamples.

TABLE 2

| Sieve | mm | Grams retained on each screen (g) | | | |
|---|---|---|---|---|---|
| | | No pass | 1 pass | 2 pass | 3 pass |
| 1 inch | 25.00 | 36.2 | 2.2 | 4.5 | 0 |
| ½ inch | 12.50 | 79.4 | 8.9 | 12.2 | 0.6 |
| ⅜ inch | 9.53 | 59.3 | 8.8 | 9.3 | 1.7 |
| ¼ inch | 6.30 | 78.6 | 56.3 | 41.0 | 14.1 |
| No. 4 | 4.75 | 31.3 | 57.1 | 59.8 | 30.7 |
| No. 8 | 2.36 | 32.6 | 76.4 | 145.0 | 122.0 |
| No. 10 | 2.00 | 4.2 | 9.7 | 22.8 | 22.5 |
| No. 16 | 1.18 | 6.4 | 15.4 | 39.3 | 44.9 |
| No. 20 | 0.84 | 2.6 | 5.9 | 15.3 | 17.6 |
| Pan | 0 | 8.2 | 10.1 | 22.1 | 22.4 |
| Shown in FIG. | | 4A | 4B | 4C | 4D |

Figure 5:
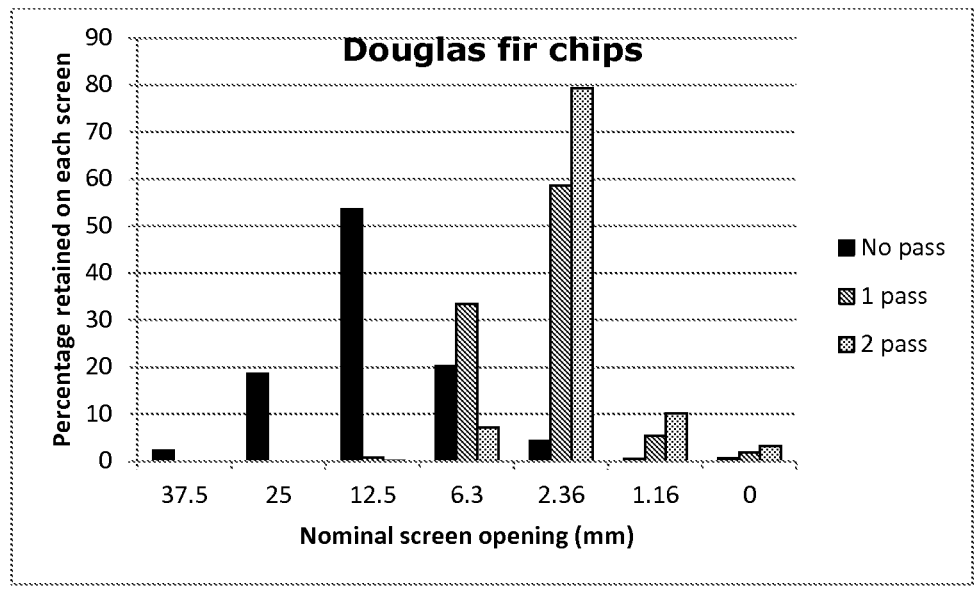
FIG. 5 shows particle size distribution data for the Douglas fir (A) and eucalyptus (B) subsamples shown in FIGS. 1 and 4; and, FIG. 6 shows representative examples of the two cross-gain end surfaces that predominantly characterize the subject wood particles: A, a smoothly cut chip-like beveled surface, aligned normal to grain, with tight fiber ends; and B, a sheared surface, aligned oblique to grain, characterized by end checking.
Figure 5:
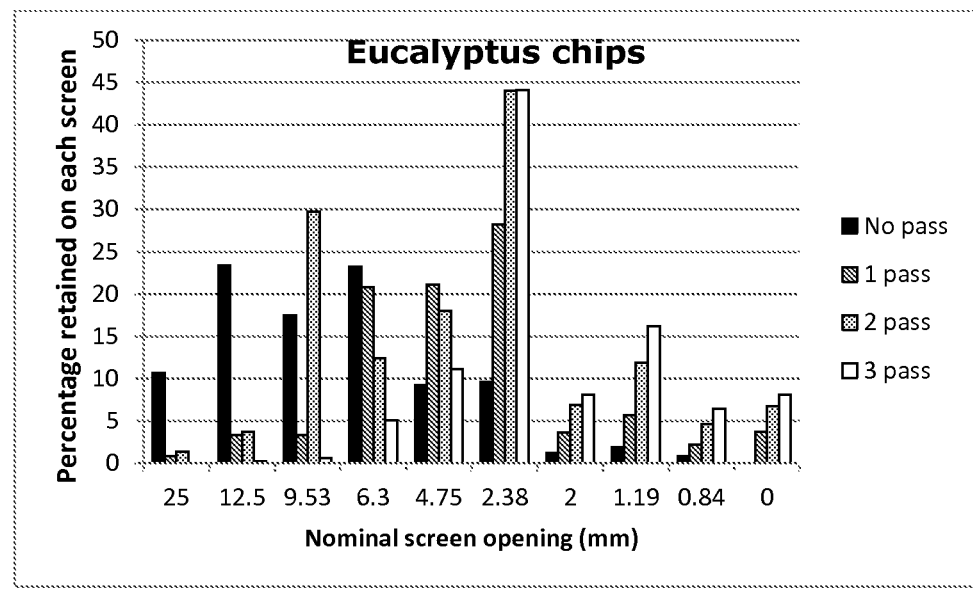

The data from Tables 1 and 2 are depicted on a percentage basis in FIGS. 5A and 5B, respectively.

Several observations are noteworthy. First, these comminution results were achieved with green wood chips (>50% wwb), in contrast to traditional hammer milling which requires that wood chips be first dried to less than ~15% wwb. Typically, the energy equivalent of more than 10% of the greenwood being milled will be consumed as fuel for the dryer burner.

Second, the comminuted subsamples had tighter size distribution profiles than the raw wood chips. Furthermore, the size distribution profiles tended to tighten further with multiple passes. It is axiomatic that such feedstock size uniformity enables greater optimization of biofuel production processes.

Third, the size distribution profiles of the comminuted subsamples of both wood materials were similar, which indicates that this comminution process (wherein each piece is sheared only once, by a uniform distance) effected uniform comminution of both the clean softwood chips and the anatomically more heterogeneous, stringy hardwood chips.

Fourth, the tighter size distribution profiles of the cumminuted subsamples tended to cluster around the 4.8 mm width of the cutters (indicated by the arrows the FIGS. 5A and 5B). We have observed that such peaks in feedstock size uniformity can be selectively shifted up or down, as required for particular end users, by processing wood chips with larger or smaller cutter widths, respectively. Moreover, the number of passes through the cutting head can be selected to adjust and optimize the particle size distribution profile of the comminuted feedstock. Referring to FIG. 5B, for example, two passes achieved a nominal 4.8 mm no-pass target better than either one pass or three passses.

Thus, the invention provides precision wood particle mixtures characterized by a substantially uniform size distribution profile as determined by the following protocol: drying 1000 g of the wood particle mixture to constant weight at 110° F.; pouring approximately 300-400 g of the dried wood particles into a stacked screen assembly selected from among the Coarse, Medium, and Fine assemblies shown in Table 3 (below); shaking the stacked screen assembly for 10 minutes on a motorized tapping sieve shaker; weighing the wood particles that are retained on each of the screens; and determining that the wood particles are characterized by a substantially uniform size range if the sum of the weights of wood particles retained on any contiguous five of the screens exceeds 80% of the poured total. Preferably, the sum of the weights of wood particles retained on any contiguous three of the screens exceeds 90% of the poured total.

TABLE 3

| top ↓ | Coarse | | Medium | | Fine | |
|---|---|---|---|---|---|---|
| | Screen Size | Sieve (mm) | Screen Size | Sieve (mm) | Screen Size | Sieve (mm) |
| 1 | 3 inch | 75.00 | 1 inch | 25.00 | ⅜ inch | 9.53 |
| 2 | 1½ inch | 37.5 | ½ inch | 12.50 | No. 4 | 4.75 |
| 3 | 1 inch | 25.00 | ⅜ inch | 9.53 | ⅛ inch | 3.18 |
| 4 | ½ inch | 12.50 | ¼ inch | 6.30 | No. 10 | 2.00 |
| 5 | ¼ inch | 6.30 | No. 4 | 4.75 | No. 16 | 1.19 |
| 6 | ⅛ inch | 3.18 | No. 8 | 2.38 | No. 20 | 0.84 |
| 7 | No. 16 | 1.18 | No. 10 | 2.00 | No. 35 | 0.50 |
| 8 | Pan | 0.00 | No. 16 | 1.19 | No. 50 | 0.30 |
| 9 | | | No. 20 | 0.84 | No. 100 | 0.15 |
| 10 ↑ bottom | | | Pan | 0.00 | Pan | 0.00 |

A Shape Distribution Profile Favorable to Flowability

Biomass piece shape is an increasingly important quality parameter for comminuted biomass. Shape affects flowability and performance of materials handling systems, pretreatment, and rate of conversion. The following observations address flowability.

Shape assessments were made of the three Douglas fir subsamples shown in FIG. 1. Some 100+ particles were randomly collected from each subsample, and extent particle dimensions were measured with a digital caliper: length (L) along the grain, width (W) normal to L and aligned cross grain, and thickness (T) normal to W and L. Particle weight was measured with an electronic balance.

Table 4 summarizes the particle dimensions (mm) and weight (g) data of the three subsamples. The calculated average (mean) values are indicated in underlined type, the standard deviations by italics, and the coefficients of variation (i.e., mean/SD) in bold type.

TABLE 4

| Douglas fir | n = | Length (L) | Width (W) | Thickness (T) | Wt. (g) | Shown in FIG. |
|---|---|---|---|---|---|---|
| Raw Whole Tree Chips | 120 | 28.08 *13.27* 2.12 | 13.53 *11.47* 1.18 | 3.91 *2.64* 1.48 | 1.03 | 1A |
| Single Pass, 3/16" Cutters | 132 | 14.49 *8.77* 1.65 | 6.61 *2.76* 2.40 | 3.62 *1.60* 2.26 | 0.23 | 1B |
| Double Pass, 3/16" Cutters | 117 | 9.88 *6.43* 1.54 | 4.02 *1.88* 2.14 | 2.22 *1.24* 1.80 | 0.10 | 1C |

Several observations are noteworthy. First, rotary bypass shear of randomly oriented wood chips produces small and uniformly shaped particles. A chip is cut just one time during each pass-through the cutting head, at a predetermined distance set by the cutter width, and the tumultuous infeed orientation randomly positions the cut across the chip's L, W, and T dimensions. In contrast, milling and grinding tend to separate fibers without cutting across the grain.

Referring to Table 4, particle length (L) was reduced by half in the first pass and further reduced in the second pass. We have observed that particle length converges on the cutter width (4.8 mm in this example) as the number of passes increases following a power law function.

Particle width (W) rapidly converged to the cutter width. Here, width was reduced by half in the first pass and was further reduced to approximately the cutter width (4.8 mm) in the second pass.

Because the no-pass chip thickness (T) was initially less than the cutter width, this dimension was not as materially reduced as the L and W dimensions. Thus, the uniform minimum distance to center (thickness) of the wood chip raw material was substantially maintained.

The net effect is smaller, more uniformy shaped wood particle mixtures that can be readily optimized to meet particular end-user process specifications, by "tuning" the rotary bypass shear comminution of locally available chipped materials with empirically selected cutter width size(s) and pass-through number(s).

Biomass conversion systems require flowable feedstocks to continuously introduce biomass materials from ambient conditions into a controlled reactor environment. Here, the combination of size and shape uniformity with consistent reduction in particle length favors feedstock flowability. Flow is the relative movement of bulk particles in proximity to neighboring particles or along the wall of a container or storage tank. Steady and reliable flow of industrial feedstocks is desirable.

Particle size and shape affect the flowability of biomass feedstocks. Generally stated, the smaller the particle size, and the more spherical the particle shape, the better the flow; for example, small cubes flow better than sticks. For biomass particles, the dimensional length/width, length/thickness, and thickness/width ratios are useful indexes of the degree of tendency toward sphericity. Decreasing the L/W, L/T, and T/W ratios of a biomass raw material during comminution will tend to enhance flowability of the resulting feedstock. Consistency in particle shape and size is also important, as relatively long particles tend to bridge and interrupt flow, and so variations in particle length should be minimal.

The following Table 5 converts the dimensional data of Table 4 into such average ratios (underlined) with standard deviations (italics) and coefficients of variation (bold).

TABLE 5

| Douglas fir | n = | L/W | L/T | T/W | Shown in FIG. |
|---|---|---|---|---|---|
| Raw Whole Tree Chips | 120 | 3.14 | 9.15 | 3.48 | 1A |
|  |  | 2.26 | 6.72 | 1.78 |  |
|  |  | 1.40 | 1.36 | 1.96 |  |
| Single Pass, 3/16" Cutters | 132 | 2.55 | 4.55 | 2.03 | 1B |
|  |  | 1.74 | 3.07 | 0.97 |  |
|  |  | 1.47 | 1.48 | 2.09 |  |
| Double Pass, 3/16" Cutters | 117 | 2.82 | 5.07 | 2.07 | 1C |
|  |  | 2.43 | 2.97 | 0.98 |  |
|  |  | 1.16 | 1.71 | 2.11 |  |

Several observations are noteworthy. First, the single-pass particles were smaller and mass (Table 4), and exhibited lower and tighter dimensional ratios (Table 5) than the raw wood chips. Hence, feedstock flowability would tend to increase.

Second, sending the single-pass material through the cutting head in random orientations a second time (Double Pass) significantly reduced particle size and mass (Table 4) while retaining the flow enhancing consistent roundness of the single-pass material as compared to the wood chip starting material (Table 5).

Third, length variation was reduced with each pass through the cutting head (Table 4), contributing to tighter L/W and L/T ratios (Table 5).

Now, to generalize these observations, mindful that the subject feedstocks will often be "tuned" to fulfill particular end-user specifications, by comminuting available wood chip materials by one or more passes through particular cutter-width arrays. However, in many embodiments, the resulting wood particle feedstock will advantageously exhibit lower and tighter dimensional ratios than as observed for the already very uniform starting material in Table 5.

Thus, the subject wood particle mixtures—when made from wood chips wherein T<L, T<W, and L>W—are preferably characterized by a shape distribution profile conducive to flowability as determined by the following protocol: drying 1000 g of the wood particle mixture to constant weight at 110° F.; selecting at random 100 of the dried wood particles; measuring the length and width dimensions of each of the 100 wood particles; calculating a L/W value for each of the 100 wood particles; calculating a mean, a standard deviation, and a coefficient of variation from the 100 L/W values, and determining that the wood particles are characterized by a shape distribution profile conducive to flowability if the calculated mean is less than 3 with a coefficient of variance less than 2.

A Substantially Uniform Minimum Distance to Center, Favorable to Heat Transfer and Diffusion Pulp wood chips have been optimized to have a substantially uniform thickness in order to promote consistent diffusion and batch digestion in pulping liquor. Uniformity in thickness or minimum distance to center will also promote consistent heat transfer in pyrolysis processing. Referring back to Table 4, it was observed that the minimum distance to center (thickness) of a wood chip raw material can be substantially maintained by selecting a cutter width that is equal to of less than the average thickness of the raw chips. Starting. The resulting wood particle feedstocks will, in many embodiments, exhibit a lower and tighter minimum distance to center value than observed for the very uniform starting material in Table 4.

Thus, the subject wood particle mixtures are preferably characterized by a substantially uniform minimum distance to center as determined by the following protocol: drying approximately 1000 g of the wood particle mixture to constant weight at 110° F.; selecting at random 100 of the dried wood particles; measuring the length, width, and height dimensions of each of the selected wood particles; selecting the smallest of the three dimensional measurements for each particle; calculating from the 100 smallest dimensional measurements a mean, a standard deviation, and a coefficient of variation value; and determining that the wood particles are characterized by a substantially uniform minimum distance to center if the calculated coefficient of variation value is less than 3.0, and preferably less than 2.0.

A Disrupted Grain Structure Favorable to Heat Transfer and Diffusion

Figure 6:
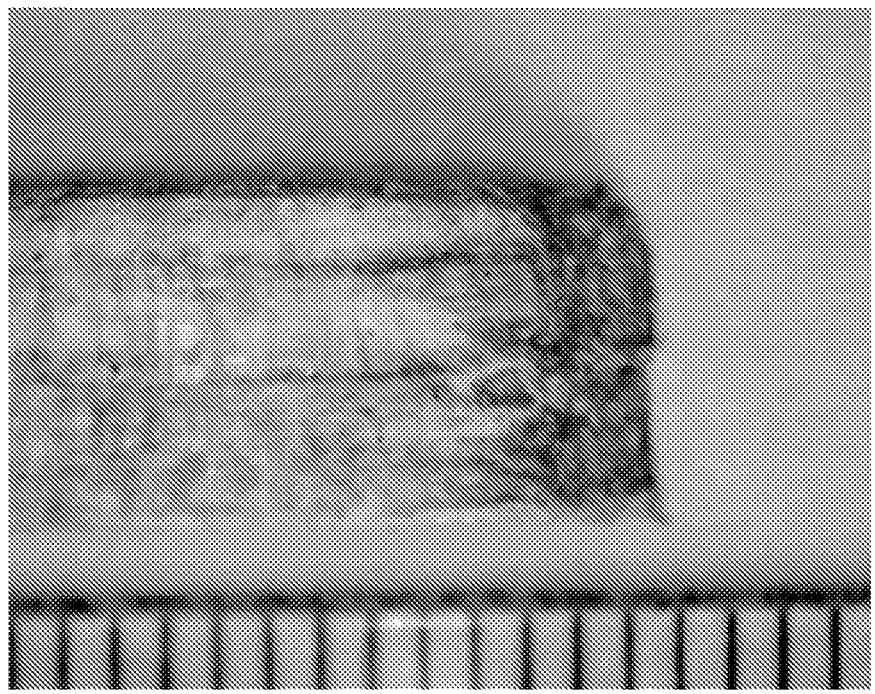
Figure 6:
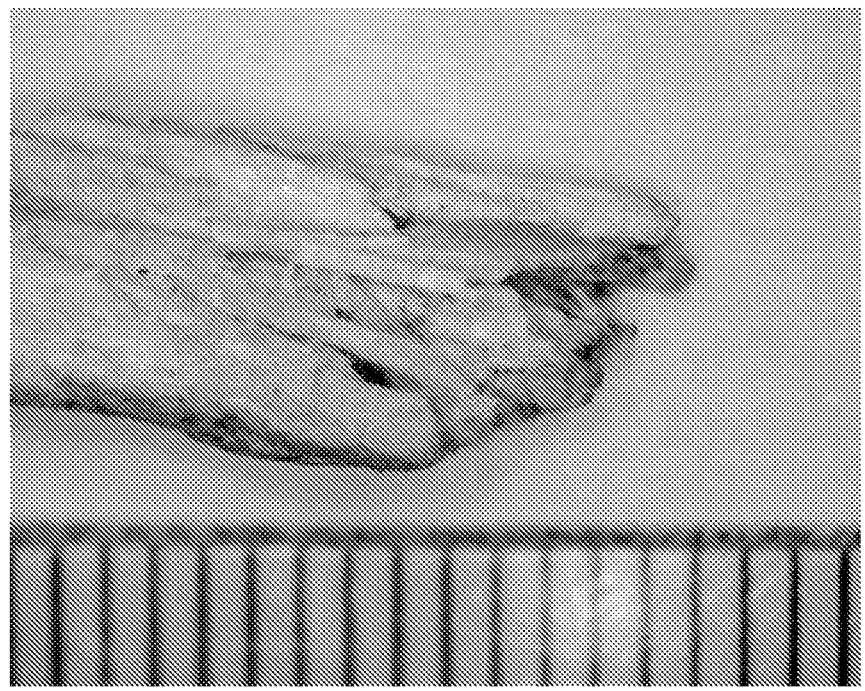

FIGS. 6A and 6B show representative examples of the two general types of lengthwise cross-gain end morphology that predominantly characterize the subject comminuted particle mixtures: A, a smoothly cut beveled surface with tight fiber ends; and B, a sheared surface characterized by disrupted fiber ends. (Scales are in millimeters.)

By way of illustration, a random handful of the fuel-chip one-pass subsample shown in FIG. 1B was gently shaken by hand on a No. 4 screen (4.76 mm) to remove smaller pieces (simply for convenient visual analysis). One hundred of the retained particles were observed using a magnifying glass for end structure morphology, using the above criteria to categorize each cross-grain end as either smoothly cut with tight fiber ends, or as having disrupted fiber ends. Results are shown in Table 6, wherein "2 Chip Ends" refers to parallelepiped-shaped particles (typically chips and pin chips) having a pair of oppositively beveled cross-grain ends cut tangential to the grain with tight fibers. "1 Chip & 1 Disrupted" refers to particles with one chip-like end ("Chip") and one cross sheared end (parallel or oblique to grain) with disrupted fiber ends ("Disrupted"). "2 Disrupted Ends" refers to particles having two cross-grain ends with disrupted fibers. We observed that the the Disrupted Ends were often cut obliquely to the grain direction, resulting in a non-parallelepiped shaped particle.

TABLE 6

| | Particle End Grain Morphologies | | | | |
| --- | --- | --- | --- | --- | --- |
| | 2 Chip Ends | 1 Chip & 1 Disrupted | 2 Disrupted Ends | Bark | Chunk | Total |
| Raw Whole Tree Chips | 92 | 0 | 2 | 5 | 1 | 100 |
| One Pass, 3/16" Cutters | 22 | 44 | 32 | 2 | 0 | 100 |

("Bark" refers to bark particles, and "Chunk" refers to an oversized piece, which were not assessed in this observation.)

The Table 6 data indicates that passing wood chips in random array through the cutting head produces grain disruptions such as tend to enhance diffusion and heat transfer in many biomass conversion processes. The net effect of shearing each chip or particle once per pass, in random orientation at one or more cutter edges is to produce a feedstock with a preponderance of obliquely sheared, disrupted ends.

Thus, the subject wood particle mixtures are generally characterized by a disrupted grain structure as determined by the following protocol: drying 1000 g of a wood particle mixture to constant weight at 110° F.; selecting at random 100 of the dried wood particles for observation; observed each cross-grain end of each selected particle to categorize each cross-grain end as either smoothly cut substantially parallel to grain or obliquely sheared with disrupted fiber ends; and determining that the wood particles are characterized by a disrupted grain structure if at least a majority of the observed cross-grain ends are obliquely sheared with end checking. Following additional passes through the cutter head, a substantial majority of the W×H surfaces in the mixture of wood particles will exhibit end checking conducive to heat transfer and diffusion.

Retained Field Moisture Content Above the Fiber Saturation Point

In order to avoid biomass recalcitrance during conversion processing, a biomass feedstock should retain its field moisture content. The term "field moisture content" refers to wood chips and to comminuted feedstocks produced therefrom that retain a harvested moisture content above the approximately 30% fiber saturation point below which the physical and mechanical properties of wood begin to change as a function of moisture content. Such a wood material has not been dried below its fiber saturation point and then rehydrated, e.g., by soaking in water.

Thus, the subject wood particle feedstocks are preferably characterized by a retained field moisture content greater than 30% dry weight basis, as determinable for example by the following protocol.

Moisture Content Determination Protocol

Definitions

Fine Material—Material where the largest 10% of the mass appears visually to be less than 10 mm (0.4 inches) in length.

Coarse Material—Material where the largest 10% of the mass appears visually to be less than 200 mm (8 inches) in length.

Large Material—Material where the largest 10% of the mass appears visually to be greater than 200 mm (8 inches) in length.

Drying Container:

Use an oven safe container rated to at least 121° C. (250° F.). Ensure that the container prevents cross sample contamination and is labeled with the sample identification number. Appropriate containers may be a colander lined with a large coffee filter, small coffee filters placed in a muffin pan, or an edged baking sheet. Multiple samples may be placed on a tray for ease of handling, provided that each sample is independently contained, labeled, and removable for weighing.

Procedure:
1. Preheat oven to 105° C. (221° F.).
2. Determine the tare weight of the container including the liner, if used, without material in the container.
   a. Weigh the container (and liner).
   b. Record the container (and liner) weight to the nearest 0.1 grams, as the "Tare Weight."
3. Place the sample material into the container.
4. Weigh and record the combined weight of the material and container (and liner if used), as the "Gross Wet Weight."
5. Place container into the oven and dry for the appropriate time listed below in the Initial Drying Time section.
6. At the initial drying time weigh and record the mass of the sample (including container, liner, and material), as "Gross Weight TH" where T is the initial drying time in hours.
7. Return the material to the oven for a minimum of one additional hour.
8. After the additional time period weigh and record mass of the sample (including container, liner, and material), as "Gross Weight TH" where T is the time in hours since sample started drying (do not subtract the time out of the oven for weighing). Return the sample to the oven and calculate the moisture content as described below in the Moisture Content Calculation section.
   a. If the change in moisture content is 1% or less, the sample is dry. Record the combined weight of the material, container, and liner as "Gross Dry Weight. Record the moisture content as "Moisture Content Final. Remove the sample from the oven and store as appropriate.
   b. If the change in moisture content is greater than 1% repeat steps 7-8 and record the moisture content as "Moisture Content TH" where T is the time in hours since sample started drying.

Initial Drying Time:

Fine Material—Material where the largest 10% of the mass appears visually to be less than 10 mm (½ inch) in thickness shall have an initial drying time of 4 hours.

Coarse Material—Material where the largest 10% of the mass appears visually to be greater than 10 mm (½ inch) in thickness shall have an initial drying time of 24 hours.

Filtrate Material—Material that is removed from a slurry shall have an initial drying time of 8 hours.

Moisture Content Calculation:
1. Calculate the Net Wet Weight by subtracting the Tare Weight from the Gross Wet Weight.
2. Calculate the Net Dry Weight by subtracting the Tare Weight from the last Gross Weight recorded.
3. Calculate the moisture content using the equation below.

$$MC_{wwb} = [(W_{wet} - W_{dry})/W_{wet}] \times 100$$

where:
$MC_{wwb}$=Moisture Content Wet Basis (i.e., % wwb)
$W_{wet}$=Net Wet Weight
$W_{dry}$=Net dry weight Low Energy Comminution Specific energy consumption for reprocessing whole-tree chips through a rotary shear appears to consume less than half the energy that would be required by a knife mill, grinder, hammer mill, or other attrition mill device. Data are shown in our provisional patent application No. 61/663,367, which is incorporated herein by reference in its entirety. In an operational setting, multipass shearing can be directly coupled where output from a first processing head (1-pass) feeds directly into a second processing head (2-pass) equipped with smaller cutter widths than the first.

While the preferred embodiment of the invention has been illustrated and described, it will be appreciated that various changes can be made therein without departing from the spirit and scope of the invention.

We claim:

1. An industrial feedstock comprising a mixture of wood particles having fibers aligned in a grain, wherein:
the wood particles are characterized by a length dimension (L) aligned substantially parallel to the grain, a width dimension (W) normal to L and aligned cross grain, and a height dimension (H) normal to W and L;
the L×H dimensions define two side surfaces characterized by substantially intact longitudinally arrayed fibers;
the W×H dimensions define two cross-grain end surfaces characterized individually as aligned either normal to the grain or oblique to the grain;
the L×W dimensions define two substantially parallel top and bottom surfaces;
a majority of the W×H surfaces in the mixture of wood particles have end checking; and,
the mixture of wood particles is characterized by a substantially uniform size distribution profile as determined by the following protocol:
drying approximately 1000 g of the wood particles to constant weight at 110° F.;
pouring 400 g of the dried wood particles into a stacked screen assembly consisting of in a contiguous size-ordered array: a top 1-inch screen having 25.00 mm nominal sieve openings, a ½-inch screen having 12.50 mm nominal sieve openings, a ⅜-inch screen having 9.53 mm nominal sieve openings, a ¼-inch screen having 6.30 mm nominal sieve openings, a No. 4 screen having 4.74 mm nominal sieve openings, a No. 8 screen having 2.38 mm nominal sieve openings, a No. 10 screen having 2.00 mm nominal sieve openings, a No. 16 screen having 1.19 mm nominal sieve openings, a No. 20 screen having 0.84 mm nominal sieve openings, and a bottom pan;
shaking the stacked screen assembly for 10 minutes on a motorized tapping sieve shaker;
weighing the wood particles that are retained on each of the screens; and
determining that the wood particle mixture is characterized by a substantially uniform size range if the sum of the weights of wood particles retained on any contiguous five of the screens exceeds 320 g in total.

2. The industrial feedstock of claim 1, wherein the sum of the weights of wood particles retained on any contiguous three of the screens exceeds 360 g in total.

3. The industrial feedstock of claim 1, wherein the wood particles are characterized by a retained field moisture content of greater than 30% dry basis.

4. An industrial feedstock comprising a mixture of wood particles having fibers aligned in a grain, wherein:
the wood particles are characterized by a length dimension (L) aligned substantially parallel to the grain, a width dimension (W) normal to L and aligned cross grain, and a height dimension (H) normal to W and L;
the L×H dimensions define two side surfaces characterized by substantially intact longitudinally arrayed fibers;
the W×H dimensions define two cross-grain end surfaces characterized individually as aligned either normal to the grain or oblique to the grain;
the L×W dimensions define two substantially parallel top and bottom surfaces;
a majority of the W×H surfaces in the mixture of wood particles have end checking; and,
the mixture of wood particles is characterized by a shape distribution profile conducive to flowability as determined by the following protocol:
drying 1000 g of the wood particle mixture to constant weight at 110° F.;
selecting at random 100 of the dried wood particles;
measuring the length and width dimensions of each of the 100 wood particles;
calculating a L/W value for each of the 100 wood particles;
calculating a mean, a standard deviation, and a coefficient of variation from the 100 L/W values, and
determining that the wood particles are characterized by a shape distribution profile conducive to flowability if the calculated mean is less than 3 with a coefficient of variance less than 2.

5. The industrial feedstock of claim 4, wherein the wood particles are characterized by a retained field moisture content of greater than 30% dry basis.

6. An industrial feedstock comprising a mixture of wood particles having fibers aligned in a grain, wherein:
the wood particles are characterized by a length dimension (L) aligned substantially parallel to the grain, a width dimension (W) normal to L and aligned cross grain, and a height dimension (H) normal to W and L;
the L×H dimensions define two side surfaces characterized by substantially intact longitudinally arrayed fibers;
the W×H dimensions define two cross-grain end surfaces characterized individually as aligned either normal to the grain or oblique to the grain;
the L×W dimensions define two substantially parallel top and bottom surfaces;
a majority of the W×H surfaces in the mixture of wood particles have end checking; and,
a majority of the wood particles are characterized by a substantially uniform minimum distance to center as determined by the following protocol:
drying approximately 1000 g of the wood particle mixture to constant weight at 110° F.;
selecting at random 100 of the dried wood particles;
measuring the length, width, and height dimensions of each of the 100 particles;

selecting the smallest of the three dimensional measurements for each particle;

calculating from the 100 smallest dimensional measurements a mean, a standard deviation, and a coefficient of variation; and determining that the wood particles are characterized by a substantially uniform minimum distance to center if the calculated coefficient of variation is less than 3.0.

7. The industrial feedstock of claim 6, wherein the calculated coefficient of variation is less than 2.0.

8. The industrial feedstock of claim 6, wherein the wood particles are characterized by a retained field moisture content of greater than 30% dry basis.

\* \* \* \* \*